OR 3,451,741

June 24, 1969 P. MANOS 3,451,741

ELECTROCHROMIC DEVICE

Filed June 15, 1966 Sheet 1 of 2

INVENTOR
PHILIP MANOS

BY Walter H. Steinbauer

ATTORNEY

FIG. 5
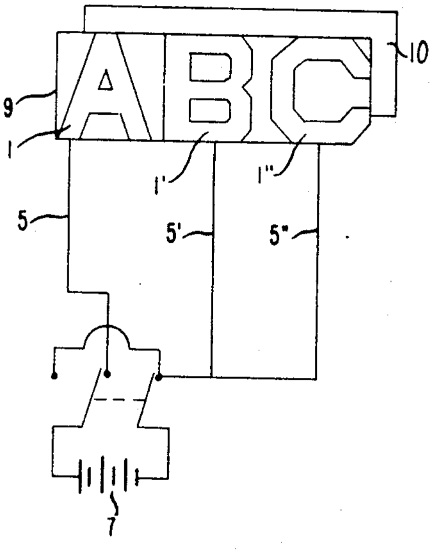
FIG. 6
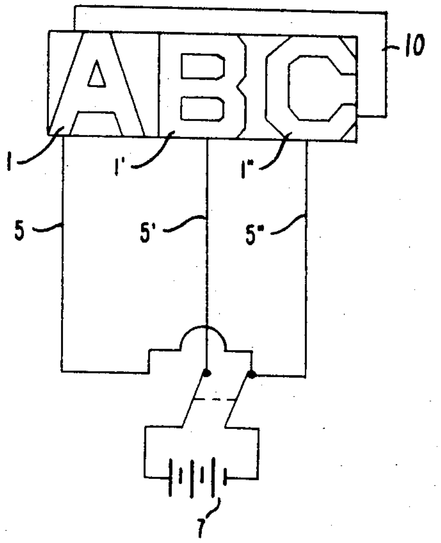
FIG. 7
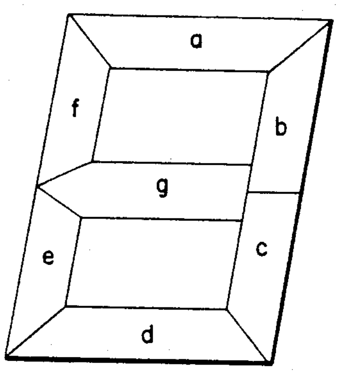
FIG. 8
| | a | b | c | d | e | f | g |
|---|---|---|---|---|---|---|---|
| 1 | | X | X | | | | |
| 2 | X | X | | X | X | | X |
| 3 | X | X | X | X | | | X |
| 4 | | X | X | | | X | X |
| 5 | X | | X | X | | X | X |
| 6 | X | | X | X | X | X | X |
| 7 | X | X | X | | | | |
| 8 | X | X | X | X | X | X | X |
| 9 | X | X | X | X | X | | X |
| 0 | X | X | X | X | X | X | |
INVENTOR
PHILIP MANOS
BY Walter K. Steinbauer Jr.
ATTORNEY 3,451,741
Patented June 24, 1969

3,451,741
ELECTROCHROMIC DEVICE

Philip Manos, Wilmington, Del., assignor to E. I. du Pont de Nemours and Company, Wilmington, Del., a corporation of Delaware Filed June 15, 1966, Ser. No. 557,669
Int. Cl. G02f *1/36*
U.S. Cl. 350—160 11 Claims The present invention is directed to novel electrically operated devices utilizing transparent electrodes, particularly to rapid-response units comprising facing area electrodes, color generating systems electrolytically reversible at low voltages, and means for optically masking one electrode reaction from the other.

Figure 1:
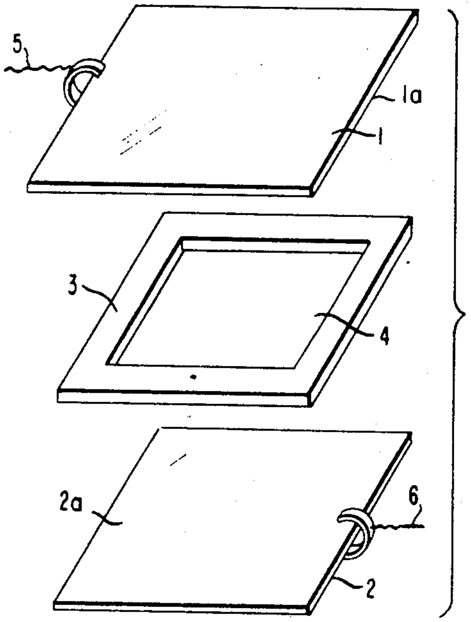

Various electrically activated devices are known for signaling the presence or absence of voltage, displaying data and producing decorative effects. Almost all utilize incandescent lamps, gas glow or cathode ray tubes, electroluminescent panels, or electromechanical features. All have limited utility.

The prior art has also electrolytically produced and erased color patterns on various solid substrates. For example, U.S. Pat. 1,068,774 discloses an electrographic display apparatus and method based on electrolytically indulced pH changes which cause pH indicators to change color. For color display, a mobile marking electrode is moved over a porous paper, felt or clay substrate that is impregnated with a aqueous-electrolyte pH indicator composition and backed by a second electrode. Repeating the operation with electrode polarity reversed erases the display.

With electrolytically reversible precursor-dye systems, alternating the direction of current flow alternately produces the color member at the opposite electrode. For example, briefly passing direct current through a suitable leuco dye in a suitable electrolyte causes color (dye) to appear instantly at the anode. On reversing the current flow direction through the cell, the color disappears at the first electrode (now the cathode) and reappears at the other electrode (now the anode).

Thus, to fabricate color reversal electrochromic cells that permit color erasure to be visibly observed, one must either hide the simultaneously occurring back electrode color-forming reaction from the viewer at the viewing electrode or prevent it altogether.

The heretofore described typical prior electrochemical display devices depend for revsibility on an opaque substrate to screen the back electrode from the viewer. The disclosed formulations are not entirely satisfactory for electrochromic cells designed to operate reversibly and substantially instantaneously over long periods of time. The prior devices tend to be short-lived and produce erratic results owing to irreversible side reactions involving color-forming system, solvent or electrolyte. The disclosed opaque substrates are limited in their ability to hide the back electrode reaction from the viewer. Also the disclosed color-forming and electrolyte systems are not repeatedly reversible under practical cell conditions. All these factors seriously affect cell durability and operability.

A recent device is disclosed in U.S. Pat. 3,015,747, utilizing transparent electrodes and generates fluorescent or visible color from an electrolyte which can dissociate into $H^+$ and $OH^-$ and contains a fluorescent or visible color pH indicator. Under applied potential $H^+$ accumulates at one electrode, $OH^-$ at the other, and the indicator accordingly fluoresces or visibly changes color at the electrodes. A reverse pulse, which averages the stored charge (i.e. separated charges) to zero, cancels the display. This system depends for color formation on voltage-induced hydrogen ion drift towards a polarizing electrode, and does not need to screen the back electrode from the viewer when erasing color. Thus it differs fundamentally from those known systems that produce and erase color through electrode reactions involving gain or loss of electrons from cell constituents.

There is still need for low-cost, low-powered, long-lived electrochromic devices, particularly for displaying data in a variety of colors as in animated advertising and variable message displays. In many such applications the color display must be readable in daylight, the response time for forming and erasing color must be practically instantaneous, and the device must operate reversibly over long periods of time. Similarly there are needed devices for transmitting colored light, as in multilayer message displays and variable light transmission windows.

Accordingly, it is an object of the present invention to provide novel transparent electrode electrochromic cells having significantly improved performance characteristics.

A further object is to provide such a unique electrochromic cell which reflects a balanced system which system minimizes side reactions in addition to being reversible over a long period of time.

Another object is to provide such electrochromic cells which are single compartment rapid response reversible cells.

These and other objects of the invention will be apparent from the following description and claims.

More specifically, the present invention is directed to a color-reversal electrochromic device comprising:

(A) A unit cell having a front transparent (viewing) area electrode spaced from a facing back area electrode (which may or may not be transparent)

(B) Means for applying a color-forming potential across the cell and for reversing electrode polarity (C) An electrolytically-conductive color change composition which comprises (1) A reductant/oxidant pair where
- (a) said reductant is a member of a redox couple, that is, said reductant is anodically oxidizable and cathodically regeneratable,
- (b) said oxidant is a member of a redox couple, that is, said member is cathodically reducible and anodically regeneratable,
- (c) at least one of said redox couples is a color change couple, that is, the redox members are differently colored, (2) A color control means for preventing visual observation of the redox couple's colored species at the back electrode when the colored species is being electrolytically decolored at the front electrode, and (3) A fluid electrolyte which
- (a) solubilizes color-imparting amounts of said redox components
- (b) is inert to the electrodes and the redox components, and
- (c) exclusive of the redox components does not electrolyze in preference to the redox components at color-forming potentials.

The redox members defined under C–1 may be members of the same or different redox couple. More specifically the reductant/oxidant pair is taken from the group consisting of:

(a) $Red_1$ and $Ox_1$ where $Red_1$ and $Ox_1$ are differently colored members of a color change redox couple, $Red_1/Ox_1$, i.e. $Red_1$ is anodically oxidizable to and cathodically regeneratable from $Ox_1$ with attendant color change;

(b) $Red_1$ and $Ox_2$, a first mixed pair, where $Red_1$ is a member of the $Red_1/Ox_1$ color change couple defined in (a) and $Ox_2$ is a member of the second redox couple, $Red_2/Ox_2$, i.e. $Ox_2$ is cathodically convertible to and anodically regeneratable from $Red_2$; and (c) $Red_2$ and $Ox_1$, a second mixed pair where $Ox_1$ is a member of the redox couple defined in (a) and $Red_2$ is a member of the second redox couple defined in (b).

In a preferred embodiment the redox potentials of the two couples are such that the second couple, which is primarily a cell-balancing couple, can function also as a color control means as more fully described hereinafter.

When the redox members are such that on reversing the electrode polarity substantially the same color alternates between the back electrode and the front electrode, as when $Red_1$ and $Ox_1$ constitute the reductant/oxidant pair, the color control means is normally a means for hiding the formation of the redox couple's colored member at the back electrode when the colored member is being electrolytically decolored (reduced and oxidized) at the front electrode.

One such specific embodiment of my invention is a device as heretofore defined wherein $Red_1$ and $Ox_1$ constitute the reductant/oxidant pair and the hiding means is an inert nontransparent opacifier in an amount renderig the matrix opaque to visible light and thereby hiding the back electrode (and its reactions) from the front (transparent) electrode.

Another embodiment is an electrochromic device as heretofore defined wherein the reductant/oxidant pair is $Red_1$ and $Ox_2$ as defined, and the potential for oxidizing $Red_1$ to $Ox_1$ is more anodic than the potential for oxidizing $Red_2$ to $Ox_2$, while the potential for reducing $Ox_2$ to $Red_2$ is more cathodic than for reducing $Ox_1$ to $Red_1$. In this embodiment the second redox couple $Red_2/Ox_2$ can serve as the color control means by preventing the formation of the color change redox couple's colored member at the back electrode while the colored member is being decolored at the front electrode. This embodiment has the further property of being self-erasing so that a hiding means, such as an opacifier described above, is an optional cell component.

Another important embodiment of the self-erasing device is a self-erasing transparent cell wherein both electrodes and the color change composition (both at rest and under applied potential) are transparent to light.

In the preferred opaque device embodiments of the invention the opacifier is a polyvalent heavy metal chalcogenide which is substantially neutral, electrolyte-insoluble, nontransparent and differently colored than at least one of the redox color-generating species; preferably the opacifier is a pigment taken from the group consisting of zinc oxide, zinc sulfide, stannic oxide, titanium dioxide and zirconium dioxide having a particle size of from 0.1 to 0.4 micron.

Still another preferred embodiment is any of the invention devices heretofore defined wherein $Red_1$ of the redox color change couple is a leuco dye which is oxidized to $Ox_1$ at a potential less anodic than +1 volt relative to a saturated calomel electrode, and $Ox_1$ is the corresponding dye which is reduced to the leuco at a potential less cathodic than −1 volt relative to a saturated calomel electrode; preferably $Ox_1$ of the color change redox couple is taken from the group consisting of anthraquinone, indigo, thioindigo, indophenol, indoaniline, diphenoquinone, and oxo-arylidene-imidazole dyes.

In still another preferred embodiment the reductant and oxidant pair is $Red_1$ and $Ox_2$ as defined in my generic definitions, $Red_1$ is further characterized as being a leuco dye as above and $Ox_2$ is taken from the group consisting of (a) electrolyte-soluble cations that are reversibly reduced to electrolyte-soluble lower valent cations, (b) electrolyte-soluble cations that are reversibly reduced to and thereby plated at the cathode as the free metal, (c) electrolyte-soluble anions that are reversible reduced to electrolyte-soluble higher valent anions, (d) electrolyte-soluble quinones that are reversibly reduced to electrolyte-soluble hydroquinones, said $Ox_2$ being cathodically reducible to, and anodically regeneratable from, the corresponding reduced form at applied potentials not more cathodic than −1 volt and not more anodic than +1 volt relative to a saturated calomel electrode.

Still other preferred embodiments are heretofore defined invention devices that utilize fluid electrolytes consisting essentially of (a) a non-aqueous inert solvent for the redox systems and (b) a current-conducting salt in an amount sufficient to impart a conductivity of at least about .001 $ohm^{-1}$ $cm.^{-1}$, said fluid electrolyte exclusive of the redox components being further characterized in that (i) the applied potential at which it begins to be oxidized is more anodic than and at least 1.25 times the potential at which the reductant members of the color change composition are oxidized and (ii) the applied potential at which it begins to be reduced is more cathodic than and at least 1.25 times the potential at which the oxidant members of the color change composition are reduced.

The present invention is based on the discovery that reversible cells, including particularly single compartment cells, with improved electrochromic characteristics can be formulated through careful selection and control of;

(1) The color change system, it being essential that the cell contain a reductant and an oxidant both of which are members of electrolytically reversible redox couples to provide rapid color formation and erasure, and long cell life under reversible conditions;

(2) The electrolyte component and its relation to the color redox system to improve cell longevity and ease and economy of operation;

(3) The use of an inert particulate opacifier to improve color contrast and provide improved screening of the back electrode reaction products; and (4) Two redox couples in combination to improve color state contrast and impart self-erasing properties.

Thus this invention provides novel electrochromic devices encompassing significantly improved electrochromic compositions formulated in accordance with the above principles that can operate on low voltages such as the few volts produced by dry cell batteries, change color in less than a second and last for long periods of time. Also, because they require only low power, these cells can be operated with transistor and micro driving circuits and used in portable battery-operated equipment.

CELL FORMULATION—GENERAL

For reversible long-lived cells, the redox color change system and the supporting chemical background must be chosen such that electrochemical color change reaction proceeds reversibly and to the substantial exclusion of background degradative (irreversible) reactions. Such reactions involving background produce impurities which eventually poison the cell, reducing its effectiveness or preventing its operation altogether.

These electrochemical relationships can be better understood by considering the potentials needed to drive the cell. The minimum potential that must be applied to cause current flow is the algebraic sum $$E \text{ applied} = Ea - Ec + \Sigma iR$$

where $Ea$ is the oxidation potential of the species to be oxidized, $Ec$ the reduction potential of the species to be reduced, and $\Sigma iR$ the sum of the various resistances in the cell and circuitry, including the $iR$ drop through the cell composition. Redox potentials, $Ea$ and $Ec$, are conveniently determined using probe electrodes versus a standard electrode, e.g. saturated calomel electrode, according to known techniques.

According to the present invention, the electrochromic system is formulated such that reversible electrochemical reactions occur simultaneously at both electrodes. When both species undergoing electrolysis at the same time at opposite electrodes belong to the same redox couple, e.g. $Red_1/Ox_1$, the oxidation potential and reduction potential are ideally substantially the same, only opposite in sign, and the minimum operating potential corresponds substantially to the total $iR$ drop. Sometimes, however, the redox potentials may differ by a few tenths volt or more. The difference, or overpotential, must be included in the applied potential.

When a mixed color change redox couple is used, e.g. $Red_1$ of a simple color change redox couple and $Ox_2$ of a cell-balancing and color control couple, the minimum redox potential will correspond either to the $Red_1/Ox_1$ or the $Red_2/Ox_2$ interconversion potential, whichever is higher. The difference between the higher redox potential and the lower redox potential will also be included along with the IR drop in the minimum potential that has to be applied to operate the cell. Whatever the color system the applied voltage should suffice to effect the desired redox reactions but not so greatly exceed this minimum as to electrolyze the background.

Background material, such as the current carrier, solvent, and opacifier when used, should be inert to the color change system and no background member should oxidize more readily than the color change system's reduced form or reduce more readily than the color change system's oxidized form. Relative to the potentials for effecting the color change reaction, the potentials at which the background essentially ceases to be a resistor and becomes a conductor, i.e. gives or takes up electrons at a substantial rate within the cell's response time should be as high as possible. More specifically, the potentials that must be applied to the cell to bring about the background's oxidation or reduction should be at least 1.25 times the potentials needed to effect the color change reaction. Stated another way, the applied potentials for effecting the color change should not be greater than 0.8 the potentials required to electrolyze the background.

For example, if the redox color system's reduced form requires a .5 volt applied potential for oxidation to color, then the supporting background should not oxidize at applied potentials less than .625 volt. Or, if the redox color system's oxidized form reduces at −.5 volt applied, then the background should not reduce below −.625 volt applied.

There are many color change systems suitable for use in the practice of this invention that are operatively reversible at electrode potentials not more cathodic than −1 volt nor more anodic than +1 volt relative to a saturated calomel electrode. There are also available a wide variety of electrolytes (current carrier and solvents) and opacifiers that constitute the supporting background in the device of this invention which do not reduce at electrode potentials less cathodic than −1.25 volts nor oxidize at electrodepotentials less anodic than +1.25 volts relative to a saturated calomel electrode. For example, with N,N-dimethylacetamide as solvent and zinc acetate as current carrier, the background's oxidation and reduction potentials are at +1.5 volts and −.8 volt versus SCE. With such background, redox color systems are chosen (as illustrated in the examples) that have redox potentials within the range +1.2 to −.64. Preferably the color system's redox potentials will lie midway between potentials at which the background begins to oxidize and reduce, so that in the above example a color redox system that operates at about .3 to .4 volt applied would be preferred.

CELL CONSTRUCTION AND OPERATION

The present invention may be better understood by first referring to the drawings and discussing typical cells and their operation.

Figure 2:
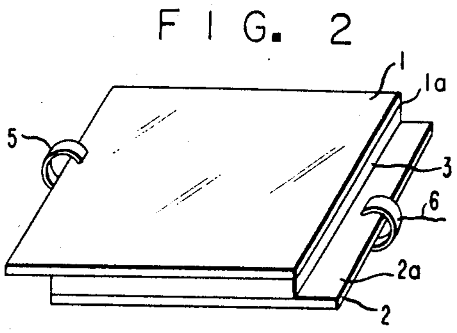
Figure 3:
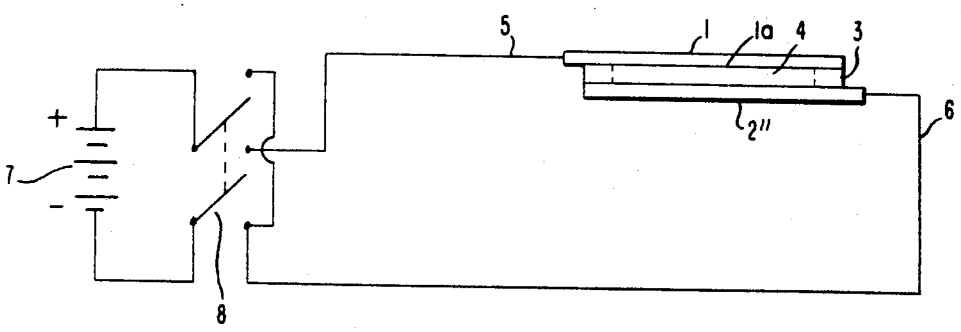

FIGURE 1 shows an exploded view of an electrochromic unit wherein area electrodes 1 and 2 are separated by nonconductive gasket 3 whose cut section 4 constitutes the cell chamber of the assembled unit as shown in FIGURE 2. Elecrode 1 is, 2 may be, transparent; they are arranged with their conductive surfaces 1*a* and 2*a* facing each other. As shown in FIGURE 3, electrical leads 5 and 6 connect the electrodes to an external direct current source 7 through a double-pole, double-throw switch 8 manually or automatically operated.

In a typical cell 2″ x 2″ x ⅛″, electrically-conductive transparent glass electrodes, with their $SnO_2$ conductive coatings face each other, are spaced 1/64″ apart by a nonconductive neoprene, polyethylene, "Teflon" fluorocarbon, glass, mica or other such inert solid gasket. The electrode area framed by the approximately square cut out section 4 is about 2 square inches. In principle, the cells may be thinner (1/100″) or thicker (1″). Practically, speaking the electrodes spaced by 3 are at least 1/100″ apart. Preferably, for fast response, they are not more than 1/10″ or 1/25″ apart. The facing electrode area defined by the cut out portion of the separator 3 may have any geometry; it may be circular, oval, rectangular, rhomboid or any irregular shape. This area may be flat or contoured to any desired degree, convex, concave or combinations thereof. The transparent glass electrodes can be shaped by selectively removing the conductive coating from designated areas or by masking the conductive surface such that only the desired portions contact the electrochemical cell formulation.

The transparent electrode conductive coating should be, of course, inert to the rest of the cell constituents; for example it must not be anodically oxidized or cathodically reduced in preference to the electroresponsive color change system of the matrix. Desirably the conductive coating should be highly and uniformly conductive in all directions for uniformity of response. Because $SnO_2$ coatings are normally only semi-conductive, their resistivities tend to be relatively high. Painting the perimeter with a low resistivity metallic paint, e.g. Ag, improves conductivity and minimizes the potential drop from leads 5 and 6 to the furthermost points on the electrode perimeter. Tin oxide coated transparent electrodes are available which, depending on the thickness, transmit 75 to 85% of the incident light and have resistivities of about 20 to 200 square ohms.

The transparent electrodes may also be in the form of a fine mesh conductive metallic screen mounted on a nonconductive transparent background (glass or plastic); or it may consist of a thin essentially transparent conductive metallic film on such background.

The back electrode may be identical to the front transparent one or it may simply be a conventional conductive nontransparent surface. Suitable conductive and otherwise inert materials are stainless steel, platinum or other noble metal, carbon, lead dioxide. Under certain circumstanes, active metal electrodes may be used, with beneficial results, as discussed later in this specification under Color Control Redox Couple.

In the assembled cell, chamber 4, bounded by electrodes 1 and 2 and separator 3, will contain an electrolytically-conductive, electroresponsive and reversible color change system, supporting fluid electrolyte, and, in this illustration, a cell opacifier, as heretofore defined and described below. The assembled cell may be sealed with any suitable sealant such as paraffin wax, rubber cement, water glass, epoxy resins, etc. Sealed cells can also be made by applying a glass gasket and a low-melting glass frit between the glass electrodes and heat-bonding them together. Two tubes sealed into the cell allow for filling and for air to escape during filling. A conductive silver film for making electrical contact can be laid down around the edge of each electrode by applying and fusing a silver/low-melting glass frit composition. After the cell is filled, the filling and air-escape tubes are flame-sealed to hermetically seal the cell.

Normally, with the FIGURE 1–3 single-compartmented device at rest, the redox color system comprising for example a reduced form, $Red_1$, and an oxidized, differently colored form, $Ox_1$, preferably in about equimolar proportions. is uniformly distributed through the cell composition in contact with both electrodes. Under operating potentials however $Red_1$ and $Ox_1$ concentrate at different electrodes, which is observed as color change.

To operate the cell, voltage is applied from power source 7 across electrodes 1 and 2 as shown in FIGURE 3. This will usually range from 1–3 volts, sometimes, because of electrolyte resistance, 4–5 volts. As discussed above the applied potential is at least sufficient to overcome the various resistances and to effect the color change redox reaction, but not to electrolyze the background during the cell's response time i.e. time to achieve the desired color effect. Under these conditions only $Red_1$ is oxidized (to $Ox_1$) at viewing electrode 1 when it is anodic and simultaneously only $Ox_1$ is reduced (to $Red_1$) at the opposite electrode 2. Thus each form begins to concentrate at opposite ends of the cell.

By the Nernst equation, the potential needed to interchange $Red_1$ and $Ox_1$ is relatively constant over large changes in reactant concentration. But the current produced is directly proportional to the reactant concentration at the electrode surface. Hence, as electrolysis proceeds, the current decreases as the $Red_1$ concentration at viewing electrode 1 decreases and the $Ox_1$ (colored reaction product) concentration increases. The color change (increase in $Ox_1$ concentration at 1) is proportional to the current and the time it flows.

Because in this particular embodiment the color system's redox forms are interconvertible and the reactant consumed at the one electrode simultaneously forms at the other, the opposite concentration (and color) changes simultaneously occur at the back electrode 2. This back electrode color change is hidden from the viewer at the front electrode by the cell opacifier in chamber 4. But, since the back electrode product ($Red_1$) tends to diffuse across the cell, it constantly becomes available at viewing electrode 1. Although the amount that diffuses to this electrode at a given instant is relatively small, as evidenced by relatively small current produced after the initial $Red_1$ supply in the vicinity of electrode 1 is depleted, the diffusion process will in time restore the original equilibrium concentrations at the electrodes, if the potential is removed. Therefore, to sustain a desired (non-equilibrium) color effect at viewing electrode 1, it is necessary to continue to apply potential from power source 7 sufficient to oxidize the $Red_1$ that continues to diffuse from electrode 2 to electrode 1.

Reversing the electrode polarity with switch 8 results in the relative concentrations at the electrodes becoming reversed. At viewing electrode 1, now the cathode, $Ox_1$ (color) is reduced to $Red_1$ (leuco); its concentration decreases, with attendant color change. The color is "erased" when the $Ox_1$ concentration falls below the visually detectible level. Again, to maintain the erased state (with its leuco-dominated color), it is necessary to continue to apply potential to reduce the $Ox_1$ being supplied by diffusion from electrode 2, through the opacifier in cell chamber 4, to transparent electrode 1.

The time required to change from one colored state to the other, or the response time, varies depending on the cell operating conditions, the cell ingredients and the effect desired. In general, the response time is shorter the narrower the electrode gap and the lower the electrolyte viscosity. It is also shorter the greater the electrolyte conductivity, the color redox species diffusion rate to and from the electrode surface, the color system tinctorial strength, and the opacifier hiding power. Fast response time is desirable in certain applications like numeric readouts. Typical cells described herein show response times as low as ¼ to 1 second.

For rapid color reversal effects, i.e. flip-flop operation, the electrode polarity is simply reversed by switch 8 when the desired unidirectional color effect has been attained.

Two or more cells can be joined in various combinations, in parallel or in series, with the different viewing electrodes having identical or opposite polarity, to provide multicolored, including animated, numeric and alphanumeric effects and displays.

Figure 4:
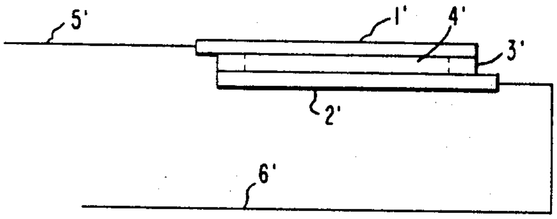

A second cell, FIGURE 4, represented by viewing electrode 1' and back electrode 2' with leads 5' and 6', can be wired in parallel with the FIGURE 3 circuit in two ways, so that (1) the viewing electrodes 1 and 1' have the same polarity; obtained by tying 5' with 5 and 6' with 6 at the switch terminals. When cell compartments 4 and 4' contain the same redox color system, the same oxidized form $Ox_1$ appears simultaneously at 1 and 1' when they are anodic; and the same reduced form $Red_1$ appears simultaneously at 1 and 1' when cathodic. But when the two redox color systems are different and differently colored, differently colored $Ox_1$ and $Ox_1'$ appear at the viewing electrodes; or so that (2) the viewing electrodes 1 and 1' have opposite polarity; obtained by tying 5' to 6 and 6' to 5. When both cells contain the same redox color system, 1 and 1' always show opposite colors $Red_1$ and $Ox_1$. Reversing switch 8 causes the color that disappears at the one electrode to simultaneously appear at the other electrode. Under rapid and repeated reversal, the display image appears to jump back and forth, creating an animated effect. When the redox color systems are different, $Red_1$ and $Ox_1'$ simultaneously appear and alternate with $Ox_1$ and $Red_1'$ at the two viewing electrodes.

The cells can be wired in series in two ways: (1) to have viewing electrodes 1 and 1' with the same polarity, join 5 and 5' at the same switch 8 terminal, disconnect 6 from its switch 8 terminal, join 6 to back electrode 2' of the second cell, and attach 6' of the second cell to the switch 8 terminal where 6 had been attached. $Red_1$ appears at 1 when $Red_1'$ appears at 1', and $Ox_1$ appears at 1 when $Ox_1'$ appears at 1', depending on whether the electrodes are cathodic or anodic. The two redox couples may or may not be the same and may or may not have the same color. When their colors are different, multicolored animated effects are created by rapidly reversing electrode polarity; and (2) to have the viewing electrodes with opposite polarity, join 5' to the switch 8 terminal where 6 is connected in FIGURE 3, disconnect 6, and join 6 with 6'. When both cells contain the same redox color system, electrode 1 displays one colored state, electrode 1' the other state. Rapidly reversing electrode polarity causes color to jump from one cell to the other.

By adding more cells to the system, and using a different redox color system in each cell, still more varied multichromic and animated displays can be produced.

In still other multicell arrangements, the separate back electrodes 2, 2', 2'', etc. of the individual cells can be replaced by a single back electrode to serve all the separate viewing electrodes, 1, 1', 1'', etc. In one such preferred arrangement, the cells are in series, with at least one front electrodes always opposite in polarity to the others, and contain the same electrochromic formulation. The individual viewing electrode areas can also be formed from a single transparent electrode, provided that each area is insulated from the adjoining areas (as by masking or etching) and each can be connected to the external circuit. FIGURES 5 and 6 show three viewing electrode areas 1, 1', 1'', as letters A, B and C, with etched boundaries outlining and separating the letters from each other and from the supporting electrode plate 9, backed by a common electrode 10 (which represents the unitized 2, 2', 2'' electrodes). For simplicity, the spacer 3 of FIGURES 1, 2, 3 and 4 is not shown in these cells. In FIGURE 5, when electrode 1 is anodic, 1' and 1'' are cathodic, and cell A alternates with B and C. In FIGURE 6, electrodes 1 and 1'' are cathodic when 1 is anodic, and B alternates with A and C.

In the novel arrangement illustrated by FIGURES 5 and 6, only the front electrodes are directly connected to the power source. In contrast to the conventional hookup, which involves separate back electrodes directly wired to one pole or the other of the battery, the back areas that face the front wired electrodes are electrically connected only to each other. Yet the device functions as if its common back "wireless" electrode is actually wired to power. Apparently, on impressing potential across the front electrodes so that one is positively, the other negatively, polarized, the back "wireless" electrode areas that face the charged electrode areas become themselves polarized, but oppositely to the charged surfaces they face and oppositely to each other. The over-all result is that a back electrode area directly facing an anodically wired electrode becomes sufficiently cathodic, while an area facing a cathodically wired electrode becomes sufficiently anodic, to react with the redox color system.

FIGURES 7 and 8 show a seven-segmented viewing electrode for a numeric readout device as an example of a preferred utility. The seven segments, designated *a, b, c, d, e, f* and *g* in the drawing, are insulated from each other but can be used with a single back electrode of substantially the same over-all area and shape. Each segment can be separately powdered so that each, together with the back electrode area it faces, constitutes a separate cell. A single back electrode can be used because the electrochromic reaction occurs only at those portions of the back electrode that directly face the segments under applied potential. Numbers from 0 to 9 can be displayed by simultaneously exciting two or more segments as shown in the table accompanying the figure. For example, *b* and *c* together make the number 1; *a, b, c, d* and *e* form 3; all together form 8.

Similarly an $\alpha$-numeric readout for displaying all the alphabet letters as well as the numbers can be constructed with a viewing electrode having 14 segments appropriately arranged.

Still another embodiment comprises a large multiplicity of small electrochromic cells, such as any of those described above, arranged as a matrix of columns and rows constituting an electrochromic billboard for displaying variable messages, sketches, graphs, photographs, etc., wherein each cell represents a point in the display.

The systems described above represent one embodiment wherein both the reduced and oxidized forms belong to the same redox couple (designated $Red_1/Ox_1$, $Red_1'/Ox_1'$, etc.) and are normally added in about equimolar proportions. Since they are interconvertible, only one member need to be added initially (e.g. if the other is not available), for eventually about half the added substance will become converted to the other member during cell operation. But until this happens, some other current-producing reaction, for example electrolysis of background current-carrier or solvent, will have to take place at the opposite electrode when the cell is first operated. This usually requires excessive potentials and results in irreversible background degradation. Such degradation can be circumvented by producing the missing member in situ before the cell is operated by directly oxidizing half the $Red_1$ to $Ox_1$ (or reducing half the $Ox_1$ to $Red_1$), or by employing a substitute that electrolyzes reversibly and nondegradatively, thereby serving to balance the cell electrochemically until the color system's redox reaction product diffuses to the second electrode in sufficient quantity to carry the current load. Use of a substitute oxidant ($Ox_2$) or substitute reductant ($Red_2$) to create a duad (mixed redox couple), $Red_1/Ox_2$ or $Red_2/Ox_1$, affords important advantages as will be evident in the discussion below.

Thus, for example, in any of the above devices the color system's reductant $Red_1$, e.g. leuco dye, can be used with another oxidant $Ox_2$, in place of $Ox_1$. When $Ox_2$ is reduced to $Red_2$ at potentials more cathodic than required for $Ox_1$, and $Red_2$ is oxidized to potentials less anodic than required for $Red_1$, the system at rest comprises $Red_1$ and $Ox_2$ so that where only $Ox_1$ is colored, the system is colored only under applied potentials sufficient to produce $Red_2$ and $Ox_1$. As the same phenomena occur in multicell devices when $Red_1/Ox_2$ is substituted for $Red_1/Ox_1$, and $Red_1'/Ox_2'$ is substituted for $$Red_1'/Ox_1'$$

the single cell only is discussed below.

To cause color change, the potential applied across electrodes 1 and 2 must suffice to reduce $Ox_2$ to $Red_2$, say at back electrode 2. This potential is more than enough to oxidize $Red_1$ so colored $Ox_1$ forms at front viewing electrode 1. On reversing electrode polarity with switch 8, $Ox_1$ is reduced back to $Red_1$ at 1, while $Red_2$ is oxidized back to $Ox_2$ at 2. When the $Ox_2$ color is noninterfering there is no need for an opacifier to hide its formation at the back electrode. Nevertheless opacified cells that also utilize such a second (color control) redox couple usually show better contrast between the two color stages than cells based on $Red_1$ and $Ox_1$ only.

Because $Red_2$ requires a less anodic potential for oxidation than $Red_1$ it reacts preferentially when both are available at the anode. Also because $Ox_1$ requires a less cathodic potential for reduction than $Ox_2$ it reacts preferentially when both are available at the cathode. Thus colored $Ox_1$ is observed to alternate with colorless $Red_1$ at viewing electrode 1. Moreover, the redox potentials are such that when $Red_2$ and $Ox_1$ come together they react $$\underset{\substack{\text{colored} \\ \text{high energy pair}}}{Red_2 + Ox_1} \longrightarrow \underset{\substack{\text{colorless} \\ \text{low energy pair}}}{Ox_2 + Red_1}$$

This means that the applied potential need only suffice to drive the reaction to the left; for on removing the potential the system reverts to its low energy state, that is the cell spontaneously self-erases.

Since $Ox_2$ requires a greater potential for reduction than $Ox_1$ the operating potential is necessarily greater for the duadic $Red_1/Ox_2$ couple than for the simple $$Red_1/Ox_1.$$

At the lower potential $Ox_2$ is no longer reduced, but $Red_2$ is still oxidized. Eventually, as $Red_2$ disappears, $Red_1$ begins to be oxidized to colored $Ox_1$ at the back electrode. Therefore such cell at the lower potential is no longer self-erasing, and another means, such as an opacifier, is needed to hide the back electrode $Ox_1$ color formation from the viewer when $Ox_1$ is being reduced at the viewing electrode.

THE OVERALL REDOX SYSTEM

As discussed above under Cell Operation, this comprises essentially a reductant that is reversibly oxidizable to an oxidant, $Red_1 \rightarrow Ox_1 + ne$, and an oxidant that is reversibly reducible to a reductant, $Ox_2 + ne \rightarrow Aed_2$. Neither the two reductants nor the two oxidants need be the same. The reductant/oxidant pair may be simple, i.e. composed of members that belong to the same couple, such as $Red_1/Ox_1$; or it may be duadic, such as $Red_1/Ox_2$, where $Red_1$ belongs to $Red_1/Ox_1$ and $Ox_2$ belongs to $Red_2/Ox_2$. Preferably, (1) at least one of the simple pairs, $Red_1/Ox_1$ or $Red_2/Ox_2$, is a redox color change couple consisting of differently colored members and (2) the $Red_1/Ox_2$ duad is differently colored than the $$Red_2/Ox_1$$

duad. Either member of the redox color change couple may be colored, but at least one will be differently colored than the other. The second redox couple may or may not be a color change couple; that is, its members may be interconvertible without color change so that this couple is essentially a color control couple (discussed below).

The two redox couples can be chosen so that the equilibrium position for the two duads produced on mixing them $$Red_1+Ox_2 \rightleftharpoons Ox_1+Red_2$$

will lie either somewhere in the middle, or preferably completely to the right or to the left. When the potential for reducing $Ox_2$ is substantially the same as required for $Ox_1$, and the potential for oxidizing $Red_2$ is substantially the same as for $Red_1$, the equilibrium position will be somewhere in the middle and all four components will be present in substantially the same proportions. Under applied potential $Red_1$ and $Red_2$ will appear at one electrode, $Ox_1$ and $Ox_2$ at the other, and the observed colors will be due to the combined presence of one pair or the other at the viewing electrode.

For the equilibrium position to be completely to the right $Red_2$ of the at rest $Red_2/Ox_1$ couple should require a higher anodic potential for oxidation than $Red_1$, and $Ox_2$ a lower potential for reduction than $Ox_1$. At the higher potential $Red_2$ is oxidized to $Ox_2$ and $Ox_1$ reduced to $Red_1$ with attendant color change as discussed previously. The original at rest color state is regained either by reversing electrode polarity or removing the potential source.

For the at rest position to be completely to the left, $Ox_2$ of the at rest couple should require a higher cathodic potential for reduction than $Ox_1$, and $Red_2$ a lower anodic potential for oxidation than $Red_1$. At the higher potential the color at the electrodes will be due to $Ox_1$ and $Red_2$. This system also reverts spontaneously to the at rest position at zero potential.

In summary, duadic (mixed) color change redox systems are preferred. Such systems eliminate the need for an opacifier or cell membrane as the essential means for hiding the back electrode reaction from the viewer. They also provide for self-erasing high color-contrast cells, especially self-erasing transparent cells.

COLOR-FORMING REDOX COUPLE

Many are known. Ferrous thiocyanate/ferric thiocyanate and ferrocyanide couple are typical inorganic couples that can be used in the practice of this invention. Cationic dyes and their leuco precursors comprise another class that may be used; for example, tris (4-diethylamino-2-methylphenyl)methane, bis(4-diethylamino-2-methylphenyl)-4-benzylthiophenylmethane, bis (4-diethylamino-2-methylphenyl) phenylmethane, and bis(4-dimethylaminophenyl)phenylmethane (leuco Malachite Green), which are electrolytically oxidized to the corresponding cationic colored form.

Cationics are best used in acidic cell compositions as to maintain the colored cationic form in the colored state as more fully discussed under fluid electrolytes. In general, too, the positively charged colored substances are best used in combination with a color control redox system, for example a metallic ion/metal couple as described more fully below.

Redox color systems in which both the reducer and oxidized members are normally electrically neutral molecules are preferred for cells designed to operate reversibly and substantially instantaneously over long periods of time. Normally, uncharged leuco/dye systems can be represented by $$DH_2 = D + 2H^+ + 2e$$

where $DH_2$ is the leuco, D the oxidized (dye) form of the couple, for example an anthraquinone, indigo or thioindigo, indophenol, indoaniline, diphenoquinone, or oxo-arylideneimidazole dye molecule.

More specifically there may be used:

(1) Anthraquinone-based leuco/dye redox systems represented by such dye forms as 1,4-bis(isopropylamino)-anthraquinone, 1,4-dihydroxyanthraquinone, 1,8-dihydroxy-4,5-diaminoanthraquinone, 1-hydroxy-4-phenylaminoanthraquinone, and 1,4-bis(2-hydroxyethylamino)-5,8-dihydroxyanthraquinone.

(2) Hydroxyaryl arylamines such as N-(4-dimethylaminophenyl)-4-hydroxyphenylamine, N-(4-dimethylaminophenyl)-4-hydroxy-1-naphthylamine, N-(4-dimethylaminophenyl)-3-chloro-4-hydroxyphenylamine, N-(4-dimethylaminophenyl)-2-chloro-4-hydroxyphenylamine, N-(4-dimethylaminophenyl)-3-bromo-4-hydroxyphenylamine, N-(4-dimethylaminophenyl)-3-ethoxy-4-hydroxyphenylamine, N-(4-dimethylaminophenyl)-3,5-dimethyl-4-hydroxyphenylamine, N-(4-dimethylaminophenyl)-3,5-dimethoxy-4-hydroxyphenylamine, and bis(p-hydroxyphenyl)amine, which are anodically oxidized to the corresponding colored indophenols and inoanilines.

(3) Diphenoquinone colors represented by leuco $(DH_2)$/dye(D) redox couples where D=diphenoquinone, 3,5,3'5'-tetramethyldiphenoquinone, 3,5,3',5'-tetra-t-butyldiphenoquinone and 3,5,3',5'-tetramethoxydiphenoquinone.

(4) Indigo, thioindigo, and the corresponding leuco structures.

(5) A new and highly preferred redox color system comprising hydroxyaryl imidazole $(DH_2)$/oxo-arylidene imidazole (D) couples

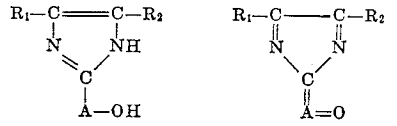

($DH_2$) (D)

where $R_1$ and $R_2$ are aryl or substituted aryl radicals, —A— is arylene or substituted arylene and the hydroxy group is positioned such that an unshared electron pair is in conjugated relationship with the imidazole ring, said substituents when present having a Hammett sigma value in the range −0.6 to 0.04. (In D, the =A=O group corresponds to X-oxo(XH) arylidene, X designating a position in the arylidene such that the oxo double bond is conjugated with the imidazole double bonds.)

$R_1$ and $R_2$ include polycarbocycles and polyphenyls, exemplified by naphthyl, anthryl and phenanthryl, biphenyl and terphenyl, in addition to monocyclic aryls such as furyl, thiophenyl, pyridyl and phenyl which is preferred, and such groups containing one or more substitutents as defined which are electronically compatible with the oxo-arylidene-imidazole chromophore.

The substituents include electropositive (electron-repelling) as well as electronegative (electron-attracting) groups. The sigma values used herein are those listed by Jaffe, Chem. Rev., 53, 191 (1953), particularly at pp. 219–233, including Table 7, the largest negative or positive value being taken on the basis that it represents the maximum electron-repelling or attracting effect of the substituent. Representative substituents and their sigma values(relative to H=0.00) are: methyl (−0.17), ethyl (−0.15), t-butyl (−0.20), phenyl (0.22), hydroxy (−0.36), butoxy (−0.32), phenoxy (−0.03); dimethylamino (−0.60), fluoro (0.34), chloro (0.37), bromo (0.39), iodo (0.35); methylthio (−0.05).

Thus, the substituents as heretofore characterized, may be halogen, hydroxyl, alkyl, aryl, aralkyl, alkaryl, alkoxyl, aroxyl, aralkoxyl, alkaroxyl, alkylthio, arylthio, aralkylthio, alkarylthio, and dialkylamino. Preferably, alkyl and alk stand for the $C_1$–$C_5$ radicals, and aryl and ar stand for aromatic hydrocarbon radicals, e.g., phenyl. Each of these substituent groups is electronically compatible with the heretofore described chromophoric unit.

Normally A contains from 6 to 10 nuclear carbon atoms, as in phenylene and naphthylene, the oxygen group is in the 2- or 4-position, and any substituent other than hydrogen when present has a Hammett sigma value in the range −0.4 to 0.4 and particularly is alkyl, halogen or alkoxyl.

A particularly preferred redox couple subclass comprises

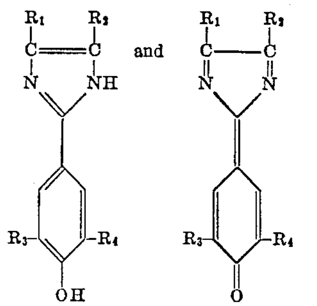

where $R_3$ and $R_4$ are hydrogen, halogen, lower alkyl or lower alkoxyl and $R_1$ and $R_2$ are phenyl or substituted phenyl, said substituents having Hammett sigma values of from −0.6 to 0.4. Specific examples are described by the following tabulated groups:

| AOH | $R_1$ | $R_2$ |
|---|---|---|
| 4-hydroxyphenyl | Phenyl | Phenyl. |
| 4-hydroxyphenyl | p-Benzylthiophenyl | Phenyl. |
| 4-hydroxyphenyl | p-Dimethylamino-phenyl. | p-Dimethylamino-phenyl. |
| 4-hydroxyphenyl | p-Methoxyphenyl | p-Methoxyphenyl. |
| 2-hydroxy-3,5-dibromo-phenyl. | Phenyl | Phenyl. |
| 4-hydroxy-3,5-dibromo-phenyl. | Phenyl | Phenyl. |
| 4-hydroxy-3,5-dichloro-phenyl. | Phenyl | Phenyl. |
| 4-hydroxy-3,5-dimeth-oxyphenyl. | Phenyl | Phenyl. |
| 4-hydroxy-3,5-dimeth-oxyphenyl. | p-Benzylthiophenyl. | p-Benzylthiophenyl. |
| 4-hydroxy-3,5-dimeth-oxyphenyl. | p-Dimethylamino-phenyl. | p-Dimethylamino-phenyl. |
| 4-hydroxy-3,5-dimeth-oxyphenyl. | Phenyl | p-Dimethylamino-phenyl. |
| 4-hydroxy-3,5-dimeth-oxyphenyl. | p-Methoxyphenyl | p-Methoxyphenyl. |
| 4-hydroxy-3,5-dimeth-ylphenyl. | Phenyl | Phenyl. |
| 4-hydroxy-3,5-dimeth-ylphenyl. | p-Methoxyphenyl | p-Methoxyphenyl. |
| 4-hydroxy-3,5-dimeth-ylphenyl. | p-Dimethylamino-phenyl. | p-Dimethylamino-phenyl. |
| 4-hydroxy-3,5-di-t-but-ylphenyl. | Phenyl | Phenyl. |
| 4-hydroxy-3,5-di-t-but-ylphenyl. | p-Methoxyphenyl | p-Methoxyphenyl. |
| 4-hydroxy-3,5-di-t-but-ylphenyl. | p-Dimethylamino-phenyl. | p-Dimethylamino-phenyl. |
| 4-hydroxy-3,5-di-t-but-ylphenyl. | Phenyl | p-Dimethylamino-phenyl. |

These neutral systems offer the following advantages: Usually both the reduced and the oxidized forms are sufficiently stable for independent existence under conditions that pertain in the cell. Each is converted to the other form at relatively low potentials; furthermore, they are repeatedly interconvertible. Neither form is too strongly held by inert filler (opacifier) so that they provide for smooth and rapid reversal while minimizing the possibility for oxidation reduction reactions of the background materials. They offer a wide color range and can be used as mixtures for multichromic effects whereby a series of color changes can be effected in a reversible manner by appropriate stepwise changes in the applied potential.

It will be appreciated that although these systems are normally neutral, the leucos, $DH_2$, having phenolic hydrogens and sometimes acidic N—H groups, may be moderately acidic salt-forming compounds. Thus, depending on the basicity of the medium, they may exist, at least to some extent, as the conjugate bases, $D^-$ and $D^{-2}$. Indeed, these anions should be more easily oxidized at the anode and may well be the first formed reduction products, $$D+2e=D^{-2}$$

$$D^{-2}+2H^+=DH_2$$

Other redox color systems that can be used include:

(1) Tetraalkyl-p-arylenediamines such as N,N,N′,N′-tetramethyl-p-phenylenediamine and N,N,N′,N′-tetramethylbenzidine which are respectively anodically oxidized to violet and green Wurtzer salts.

(2) Phenazine, phenoxazine and phenothiazine color systems represented by leuco ($DH_2$)/dye (D) redox couples where D is

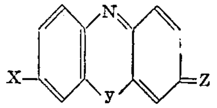

and where

| X | y | Z | Common Name |
|---|---|---|---|
| H | N-phenyl | O | Aposafranine. |
| H | O | O | Phenoxazone. |
| H | S | O | Phenothiazone. |
| $Et_2N$ | O | $\overset{plus}{N}Et_2$, $CH_3CO_2^-$ | Colour Index 2d Ed. No. 51,004. |
| $Me_2N$ | S | $\overset{plus}{N}Me_2$, $CH_3CO_2^-$ | Methylene Blue acetate. |

COLOR CONTROL MEANS

In one embodiment of this invention, an opacifier physically hides from the viewer at the front electrode the conflicting color change occurring at the back electrode. In another, preferred embodiment a second redox system controls color viewing by preventing the otherwise interfering color change from occurring at the back electrode. Both, in concert, not only can prevent the viewer from seeing the back electrode reaction products, but also can provide sharper and cleaner changes in color state on going from one state to the other, owing to the self-erasing character of the duad-couple redox color system.

(1) Opacifier: The opacifier must (1) render the cell composition opaque to visible light and thereby hide the back electrode from the viewer, (2) be substantially insoluble in the electrolyte, (3) be chemically inert to the other cell constituents, and (4) be electrochemically inert relative to the precursor-dye system. Also, it should not so strongly adsorb the electrochemically reactive species as to render them inaccessible for the electrode reaction when electrode polarity is reversed. In use, the opacifier, in combination with current carrier, color-change system and a solvent as described above (which is a solvent for the electrolyte and color display components but is a nonsolvent for the opacifier), is dispersed in a continuum between the electrodes in the form of electrically conductive pastes, compressed solids, films, and other solid articles.

In general, paper, felt, fibers (both natural and synthetic) plastics, ceramics, powdered glass (silica) and various inorganic oxides, sulfides and carbonates, may be used in the practice of this invention. Especially suited however are particulate metal oxide and sulfide pigments as heretofore described, particularly where the metal is a polyvalent heavy metal having an atomic number of at least 21, heavy metal being defined as in H. G. Deming's Fundamental Chemistry, 2nd ed., John Wiley and Sons. Normally such chalcogenide when mixed with water does not impart thereto a pH outside the range 5–8. It is preferably light-colored especially white. Its particle size is not critical. Good results have been obtained with sizes in the range 0.1 to 0.4 microns. Representative examples are antimony and bismuth trioxide; hafnium, zirconium, and titanium dioxide; lead monoxide, tin dioxide; yttrium oxide; zinc, cadmium, and mercuric oxide. Suitably colored corresponding sulfides may also be used, particularly zinc sulfide. Especially preferred are $TiO_2$ (rutile), ZnO (including zincite), zinc sulfide (wurtzite, sphalerite, blende) including lithopone, $SnO_2$ and $ZrO_2$.

These metal chalcogenide opacifiers provide electrochromic compositions that have superior hiding power and remain in intimate contact with the transparent electrodes so that response times for erasing colored displays can be very short. In comparison, other metal pigments that may sometimes be used (such as magnesium oxide, beryllium oxide, calcium carbonate (chalk), alumina, basic lead carbonate, fibrous talc, barytes, china clay, terra alba, and whiting) are in general less effective electrode screens.

Also, the more basic oxides tend to adversely adsorb neutral dyes, the more acidic oxides cationic dyes, thereby slowing response times. Cellulosic opacifiers, such as paper, also adversely adsorb many dye classes and it is difficult to maintain them in close contact with the electrodes. Hence they too are less practical for use in rapidly reversible color change systems.

(2) Color control redox couple: Like the color forming redox couple, this comprises a reductant and an oxidant electrochemically interconvertible by electrode reaction involving gain and loss of electrons $$Red_2 \rightleftharpoons Ox_2 + \text{electrons}$$

It differs from the other in that the two forms may or may not be differently colored. It must however cooperate with the other to produce the two duadic redox states, $Red_1/Ox_2$ and $Ox_1/Red_2$, having different colors and different energies.

For color control, one member of this couple should be more difficulty, the other member more easily electrolyzed than its counterpart of the color change couple, so that the at rest state corresponds essentially to either duad, $Red_1/Ox_2$ or $Red_2/Ox_1$, and the higher energy state corresponds to $Ox_1/Red_2$ or $Ox_2/Red_1$. With $Red_1/Ox_2$, color control depends on the higher energy $Red_2$ (that forms in situ from Ox under applied potential) being a better reducing agent than $Red_1$ so that $Red_2$ (a) is preferentially oxidized at the anode and (b) spontaneously reduces $Ox_1$ to $Red_1$ on contact, as discussed above under cell operation. Likewise, with $Ox_1/Red_2$ the at rest couple, color control depends on $Ox_2$ being a better oxidizer than $Ox_1$ so that $Ox_2$ (a) is preferentially reduced at the cathode and (b) spontaneously oxidizes $Red_1$ to $Ox_1$ on contact. By better reducing and oxidizing agent is meant that the electrolysis potential is at least 0.05 volt, more usually at least 0.1 volt, less cathodic or anodic as the case may be to ensure that the system at rest consists practically completely of the one reductant and one oxidant with substantially none of the corresponding products present in visually detectable amounts.

The color control redox member of the at rest system, i.e. $Red_2$ or $Ox_2$, may be a current carrier cation or anion in the form of a salt, or it may be a neutral molecule, that electrolyzes reversibly and non-degradatively. One class comprises heavy metal cations that, functioning as $Ox_2$, plate out as free metal when the back electrode is cathodic and reoxidize to $M^{+n}$ when the electrode is anodic.

Examples are $Pb^{II}$, $Cu^{I}$, $Ag^{I}$, $Zn^{II}$, $Cd^{II}$, $Sn^{II}$ and $Tl^{I}$. These cations together with their free heavy metal reduction products constitute color control redox couples $Red_2/Ox_2$, i.e. $M/M^{+n}$, where M is the heavy metal and $n$ its valence, usually from 1 to 2.

The metal deposited in the reduction step constitutes a new electrode. One embodiment contemplates the use of such metal electrode, which, besides serving to collect current, takes part in the redox reactions. For example, when the color erasing reaction involves dye to leuco reduction $$D\ (\text{colored } Ox_1) + 2H^+ + 2e \rightarrow DH_2\ (\text{colorless } Red_1)$$

and the oxidation of $DH_2$ occurs at a more anodic potential than the oxidation of zinc, a zinc back electrode will itself supply the electrons for the color erasing reaction, not the leuco dye $$Zn \rightarrow Zn^{+2} + 2e$$

The zinc electrode thereby prevents the color-forming reaction from occurring at the back electrode and eliminates the need for a cell opacifier. Furthermore electrode M having a higher reduction potential than $Red_1$ makes the cell self-erasing. On being galvanically coupled to the transparent viewing electrode through a low impedance path it imposes a back potential on that electrode sufficient to reduce colored $Ox_1$ to colorless $Red_1$.

Redox couples whose both forms remain soluble in the electrochromic composition are particularly preferred for color control, as these can serve as internal color erasers.

Included are cationic redox couples, represented by $M^{+p}/M^{+q}$ where M is a heavy metal, $p$ is an integer, usually from 1 to 2, and $q$ is a higher integer, usually from 2 to 4, such as $Fe^{II}/Fe^{III}$ and the $Sn^{II}/Sn^{IV}$; and anionic redox couples, such as ferrocyanide/ferricyanide. The higher valent cations and the lower valent anions serve as $Ox_2$ in the $Red_1/Ox_2$ at rest system; the lower valent cations and the higher valent anions serve as $Red_2$ in the at rest $Red_2/Ox_1$ system. The counterions will of course be electrochemically inert, as discussed below under fluid electrolyte.

Quinone ($Ox_2$)/hydroquinone ($Red_2$) couples broadly are especially suited for color control, $$Q + 2H + 2e = H_2Q$$

where Q for example stands for p-benzoquinone, 2,5-dimethyl benzoquinone, 2,5-di-t-butyl-p-benzoquinone, 1,4-naphthoquinone, duroquinone, and anthraquinone.

Like the neutral color change redox couples discussed above, the $Q/H_2Q$ system offers several advantages. Both forms are generally stable and are repeatedly interconvertible at relatively low potentials with little or no overpotential. Both forms of many of such couples are substantially colorless, or only lightly colored, and function well in the presence or absence of cell opacifiers.

FLUID ELECTROLYTE

This normally consists essentially of an inert current carrier in a suitable inert solvent, both chosen to provide solutions with conductivities of at least .001 $ohm^{-1}$ $cm.^{-1}$, preferably at least .01 $ohm^{-1}$ $cm.^{-1}$, and as high as practical since the greater the conductivity the lower the internal resistance, the heat buildup, and the energy required to operate the cell. The maximum obtainable conductivity depends on the particular current carrier, the solvent and its dielectric constant and viscosity, and the other components of the electrolyte composition and their character. Since the actual quantities needed for a particular conductivity will vary with the particular salt, the solvent, and their relative concentrations, it is impossible to specify absolute ranges for all possible electrolyte compositions within the scope of this invention. Those skilled in the art however already know how to determine the proportions required for any electrolyte materials.

The current carrier is normally added as an ion-forming salt. Sometimes a self-dissociating solvent such as acetic acid serves both as current carrier and solvent for the other cell components. Whatever its structure or chemical composition, the current carrier must be substantially inert: It must not react adversely with any cell ingredient, nor chemically oxidize or reduce the overall redox system, nor electrolyze in preference to the overall redox system. More specifically the cationic component must have a more cathodic reduction potential (be more difficultly reduced) than the oxidized form of the redox system and a more anodic oxidation potential (be more difficult to oxidize) than the reduced form of the redox system. At the same time the anionic counterion must have a more anodic oxidation potential than the reduced form and a more cathodic reduction potential than the oxidized form.

The current carrier is preferably a neutral or only moderately basic or acidic salt, i.e. exerts a pH when measured in water of between about 4 and 9. Strong hydrogen acids and strongly alkaline reacting current carriers are less suitable as they tend to attack the tin oxide semi-conductive transparent electrode coatings and react with other cell constituents. Suitable materials include mono-, di-, tri- and tetravalent metal and onium salts of inorganic and organic acids. Thus the cationic moiety may be: (a) an alkali, alkaline earth, and aluminum family metal of Groups I–A, II–A and III–A of the Periodic Table described in Fundamental Chemistry, 2nd ed., by H. G. Deming, John Wiley and Sons, Inc.; (b) a mono- or polyvalent metal of other groups of the Periodic Table, such as monovalent thallium of Group III–B, divalent lead or tetravalent tin of group IV–A; (c) trivalent lanthanum or other rare earth metal; (d) a I–B or II–B metal such as copper, silver, zinc, cadmium or mercury; (e) tetraalkyl ammonium wherein each alkyl usually has 1 to 5 carbons, such as tetramethyl ammonium, tetraethyl ammonium, tetrabutyl ammonium, trimethylethyl ammonium, trimethylisoamyl ammonium and dimethyldiethyl ammonium.

The anionic component is normally such that the pKa of its conjugate hydrogen acid is 5 or less. It may be inorganic or organic and is generally chosen for its inertness and solubilizing effect on the salt as a whole. Particularly preferred are oxyanions wherein the central element is in its highest oxidation state such as sulfates, sulfonates, perchlorates and carboxylates. Halides, cyanides, cyanates and other comparable anions can also be used to advantage in association with said cations described above.

Moderately acidic current carriers having Lewis acid character constitute one preferred current carrier class, for example polyvalent metal salts such as: Al chloride and p-toluenesulfonate; Zn chloride, methoxyacetate, acetate, phenylacetate, trifluoromethylacetate, benzenesulfonate, p-toluenesulfonate, and ethanesulfonate; Cd acetate; Ca chloride; $Pb^{II}$ acetate and perchlorate; $Hg^{II}$ chloride and acetate.

These are particularly adapted for use with the preferred color systems and preferred (nonaqueous aprotic) solvents. Overall they (1) Minimize adsorption of dye or metal oxide opacifiers, thereby preventing undue dye accumulation and increasing reversible lifetime, (2) Help maintain the fluid electrolyte redox color system/inert opacifier compositions homogeneous, preventing solvent bleed, (3) Minimize interference by dissolved oxygen by shifting leuco oxidation potentials to more anodic values, (4) Stabilize the preferred oxo-arylidene imidazole colors, even when water or other protic solvent is present, and (5) Stabilize cationic dyes which must remain unneutralized by bases to retain color.

Substantially neutral salts, particularly Group I–A metal and tetraalkyl ammonium organic sulfonates and perchlorates, constitute another preferred current carrier class. They are highly inert electrochemically and impart high conductivities, thereby permitting low voltage, low cost operation and providing fast display response. They are preferably used with electrically neutral precursor-dye systems. Examples are: Li chloride and perchlorate; K cyanate and iodide; Na p-toluenesulfonate; $Tl^{I}$ benzenesulfonate, p-toluenesulfonate and perchlorate; $Me_4NBF_4$, $Me_4N$ perchlorate; EtN chloride and perchlorate; $(n\text{-}Bu)_4N$ 1,1-dimethylethanesulfonate and $(n\text{-}Bu)_4N$ p-toluenesulfonate.

Moderately basic current carriers such as the Group I–A and II–A metal and tetraalkyl ammonium carboxylates are generally useful with neutral and negatively charged precursor-dye systems, not with cationic color systems. With the preferred oxo-arylidene-imidazole and other neutral dye systems, they are best used in nonaqueous media and are especially useful where it is desirable to facilitate anodic oxidation of leuco base to dye. Examples are: Li acetate; Na acetate and benzoate; K acetate and propionate; $Et_4N$ acetate; $K_4Fe(CN)_6$; $Tl^{I}$ acetate; $Me_4NSCN$.

Current carriers that do not electrolyze in preference to the color-forming couple but do so reversibly and nondegradatively in preference to the solvent or other cell constituent are useful color control agents, as discussed above. They also function as internal safety valves to protect solvent (generally more costly) against direct electrolytic degradation. For example cations such as $Sn^{II}$, $Pb^{II}$, $Fe^{II}$, $Hg^{I}$ and $Cu^{I}$ and anions such as $Fe(CN)_6^{-4}$ can protect solvent from anodic degradation. Cations such as $Zn^{II}$, $Pb^{II}$, $Sn^{IV}$ and $Tl^{I}$ and anions such as $Ee(CN)_6^{-3}$ provide cathodic protection to solvent.

ELECTROLYTE SOLVENT COMPONENT

The solvent can vary widely provided it (1) dissolves sufficient quantities of (a) the current carrier to provide conductivity and (b) the redox color system to provide the desired color changes during cell operation, (2) is inert towards the other cell ingredients, and (3) is electrochemically stable during cell operation.

Preferably the solvent should also have a high dielectric constant so as to provide highly conductive solutions, low viscosity for good ionic mobility over the entire range of cell operation, and low volatility to minimize solvent loss from the cell, and should remain liquid over a wide temperature range.

The solvent is preferably non-aqueous. Included are organic hydroxylic solvents, such as methanol, ethanol and other lower alkanols, acetic and other alkanoic acids, and nonhydroxylic organic solvents in general. Suitable nonhydroxylic organic solvents are the organic amides, preferably of secondary amines, including carboxamides, sulfonamides, phosphoramides, ureas and cyanamides; nitriles; sulfoxides; sulfones; ethers; thiocyanates; carboxyl esters; nitro compounds; and ketones. Specifically, there may be used acetonitrile, propionitrile and higher homologs; N,N-dimethylformamide, N,N-dimethylacetamide, N-methylcaprolactam, N-methylpyrrolidone, N,N-diethylformamide; hexamethylphosphoramide, hexaethylphosphoramide; N,N-dimethylethanesulfonamide; tetramethylurea; dimethyl sulfoxides and other lower alkyl sulfoxides such as diethyl sulfoxides; acetone, methyl ethyl ketone and diethyl ketone; diethylene glycol dimethyl ether and diethylene glycol methyl ethyl ether; ethyl thiocyanate, propyl thiocyanate; propylene carbonate; pyridine, picoline; N,N-dialkylamino nitriles such as N,N-dimethylcyanamide and homologs; nitromethane and nitrobenzene. Mixtures of any two or more of such solvents may be used as the electrolyte solvent. Water may be present in small proportions in the electrolyte but is generally avoided because it is easily electrolyzed, consequently tends to interfere with the color change reaction.

Carboxamides such as dimethylformamide and dimethylacetamide are particularly preferred in combination with polyvalent metal current carriers having Lewis acid character, pigment opacifiers and redox color systems wherein both the reduced and oxidized members are normally electrically neutral molecules as described above.

From the above it will be appreciated that all the cell components are interdependently related; that the choice of current carrier for example depends on the solvent, the color redox system, and the other components. For determining component suitability and compatibility, standard redox potentials are a useful guide; still redox potentials can vary markedly with changes in environment. For example, the electrolyte can influence leuco/dye redox potentials. In general, acidic current carriers shift leuco oxidation potentials for many dye classes (including the preferred oxoarylidene imidazole, diphenoquinone and related neutral quinonoid dyes) to more anodic values; in contrast, basic electrolytes render such precursor more easily oxidized.

Further, redox potentials of a particular current-carrying ion depend in part on its counterion and the solvent. In general, metal chlorides resist oxidation better in acetonitrile, nitrobenzene or glyme, where the salts dissociate to a lesser extent than in dimethylformamide or dimethylacetamide. Also the counteranion can determine whether a cation such as $zinc^{II}$ is reduced at the cathode in preference to dye molecule; e.g. zinc acetate resists reduction better than zinc chloride. Similarly, the tendency for chloride or iodide ion to oxidize in preference to dye precursor at the anode depends on the cation; e.g. silver and mercury iodides resist oxidation better than potassium iodide.

The choice of solvent too depends on the other cell constituents. For example, an oxidizing solvent such as dimethylsulfoxide should only be used with suitably resistant precursor-dye systems, i.e. having oxidation potentials more anodic than −0.3 volt versus a saturated calomel electrode. Also basic solvents such as pyridine should only be used with color redox systems that can form stable color in their presence, e.g. 2-(4-oxo-3,5-dimethyl-2,5-cyclohexadienylidene)-4,5-diphenyl 2H-imidazole, which is of the class of color system discussed above under the hydroxyaryl imidazole/oxo-arylidene imidazole redox color couple.

ELECTROCHROMIC COMPOSITION PROPORTIONS

As discussed above the compositions utilized in the practice of this invention comprise essentially a color system in color-imparting amounts, an electrolytically-conductive fluid electrolyte, and, where used, an opacifier to hide one electrode reaction from the other. More specifically, the compositions normally contain, per liter of electrolyte solvent: about .01–1 mole reductant as described above, .01–1 mole oxidant as described above, more usually .02–.5 mole each, with reductant/oxidant ratios ranging from 2/1 to 1/2, more usually about 1/1; .01–1 mole current-carrying salt, more usually at least .05 mole; and .5–5 kg., more usually 2–3 kg. opacifier. Thickeners, such as "Orlon" acrylic fiber, "Butacite" polyvinyl butyral resin, and "Cab-O-Sil" colloidal silica, are sometimes used, as illustrated in examples, in amounts of from .025–.5 kg./liter electrolyte solvent.

In the following representative examples illustrating the present invention, the conductive glass electrodes utilized were characterized by a 50 ohm per square resistivity and 80 percent transparency. The pigments where used had particle sizes in the .1 to .4 micron range unless otherwise specified. After being loaded with the electrochromic compositions, the cells were edgesealed by dipping in molten paraffin. The voltages given are applied, obtained with 1.5 volt dry cell batteries or a variable voltage power supply, and are not necessarily the optimum or the minimum needed to operate each cell. The actual redox potential for each cell is, of course, lower than the operating potential and can be determined with probe electrodes relative to a reference electrode. Other details are described below.

EXAMPLE 1

A cell as described under FIGURE 1 and having 2″ x 2″ x ⅛″ transparent conductive electrodes spaced 1/32″ apart was filled with a smooth paste prepared by mixing

- 100 grams of zinc oxide powdered to particles ranging from .1 to .3 micron
- 31 grams (33 ml.) of N,N-dimethylacetamide
- 2.4 grams (.01 mole) of tetraethylammonium trifluoroacetate
- .4 gram (.001 mole) of dye identified below and
- .4 gram (.001 mole) of leuco dye identified below

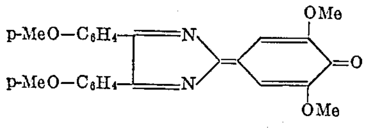

red dye

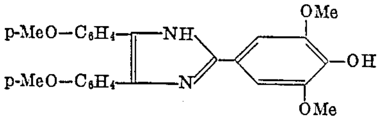

colorless leuco

An automatic cycling power supply applied 1.5 volts potential difference across the electrodes for 7 days at one cycle per second, 7 days at two cycles per second, then 8 days at one cycle per second. This corresponds to $4\times10^6$ white to red color changes at the transparent electrode. There was no sign that the cell had deteriorated during this period.

The background is substantially completely inert at the operating potential. At least 3 volts must be applied to electrolyze the support background, evidenced by the appearance of gas bubbles, cracks in the paste and blotchy displays.

Substantially identical results were obtained on replacing the quaternary ammonium tetraethyl acetate by potassium acetate.

EXAMPLE 2

A cell as in Example 1 was filled with a portion of a paste made by mixing

- 43 grams zinc sulfide
- 20 ml. dimethylformamide (DMF)
- 1.8 grams (.01 mole) zinc acetate
- 2.0 grams (.005 mole) leuco dye, 2-(4-hydroxy-3,5-dimethoxyphenyl) 4-phenyl-5-(4-dimethylaminophenyl) imidazole, having the structure

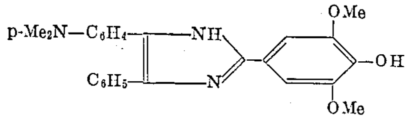

At 2.3 volts the initially white anode displayed a green color. By reversing electrode polarity every .56 second, $3.5\times10^6$ green to colorless transitions were effected during three weeks of uninterrupted operation.

In this system (comparing Example 1) zinc ion has replaced the oxidized form of the leuco dye as the initial oxidant and takes part in the overall electrochemical reaction reversibly and non-degradatively: $Zn^{+2}$ reduces to Zn metal at the cathode and reforms when the electrode becomes anodic on reversing polarity ($Zn^{+2}+2e=Zn$). At the opposite electrode leuco oxidizes to green dye and reforms (color erased) when that electrode becomes cathodic ($DH_2=D+2e+2H^+$). The applied potential, to interconvert $Zn^{+2}$ and Zn, is greater than normally needed to interconvert leuco and dye, but is insufficient to electrolyze acetate, sulfide, or DMF of the background. Once the dye concentration has built up in the cell (e.g. after about 1,000 cycles) zinc ion is no longer needed for reduction at the cathode. The potential can then be decreased to that needed for the dye-leuco interconversion or about 1.5 volts. Zinc ion then functions as electrolyte only. At either of these potentials the background is inert, and requires at least 3 volts for electrolysis.

Note that on removing the potential, the cell eventually decolorizes due to the reduction of dye to leuco by the zinc that had plated on the cathode. This self-erasing can be speeded up by connecting the zinc-plated cathode to the transparent anode through a low impedance path. This is illustrated further below.

Good results are also obtained on replacing (1) the ZnS opacifier by ZnO, $TiO_2$ or $SnO_2$, (2) the solvent by tetramethylurea, acetonitrile, or glacial acetic acid, and (3) the leuco dye by 3,5,3′,5′-tetramethoxy-4,4′-dihydroxybiphenyl (which oxidizes to cerulignone, the red-purple corresponding diphenoquinone) or 3,5,3′,5′-tetra-t-butyl-4,4′-dihydroxydiphenyl (which oxidizes to the corresponding yellow-orange diphenoquinone).

EXAMPLE 3

A cell as in Example 1 was filled with the paste by mixing

- 1.1 grams (.005 mole) N-(4-hydroxyphenyl)-4′-dimethylaminoaniline, commonly known as leuco phenol blue
- 1.8 grams (.01 mole) zinc acetate
- 40 grams zinc oxide
- 20 ml. N,N-dimethylacetamide.

At 1.5 volts applied potential with polarity reversed 3 times each second this cell showed over 1,000,000 blue to white color changes. Leuco naphthol blue performs just as well as leuco phenol blue.

The blue indoaniline color is formed in situ at the anode while zinc plates out at the cathode as in Example 2. In the reverse reaction the phenol blue is reduced back to leuco dye in this formation either in Example 2, when enough dye is produced in situ, the cell reaction can be balanced by reduction of that dye instead of by reduction of zinc ion.

Good results are also obtained on employing as the leuco dye in this formation either (1) N-benzoyl methylene blue,

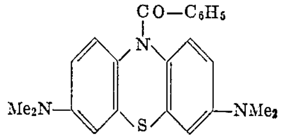

as the leuco, which oxidizes to blue dye, probably with loss of the benzoyl group (a blocking group which stabilizes the leuco against air oxidation in storage), (2) 1,4,9,10-tetrahydroxyanthracene, prepared by zinc-reduction of the corresponding red 1,4-dihydroxyanthraquinone and anodically oxidized thereto under cell conditions, or (3) 1,5-diamino-4,8,9,10-tetrahydroxyanthracene, prepared by zinc reduction of the corresponding blue 1,5-diamino-4,8-dihydroxyanthraquinone and anodically oxidized thereto under cell conditions.

EXAMPLE 4

A cell as in Example 1 was loaded with a zirconium oxide opacifier paste made from 2.2 grams (0.005 mole) leuco dye of Example 1
1.8 grams (0.01 mole) zinc acetate
45 grams zirconium oxide
20 ml. dimethylformamide This cell operates according to the principle discussed in Example 2. At 1.5–2 volts applied it displayed red at the anode and white at the cathode, about once every second for over 70,000 reversals.

Substantially identical results were obtained with yttrium oxide ($Y_2O_3$) and hafnium oxide ($HfO_2$) in place of the $ZrO_2$.

EXAMPLE 5

A cell as in Example 1 was loaded with a paste made by mixing 0.9 gram (.002 mole) 2-(4-hydroxy-3,5-dimethoxyphenyl)4,5-bis(dimethylaminophenyl)imidazole,

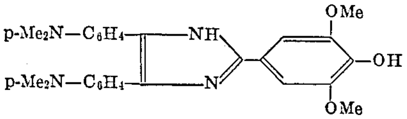

1.4 grams (.004 mole) $Tl^I$ acetate
2.5 grams zinc oxide, and
12 ml. dimethylformamide.

At 0.7–0.8 volt applied, this cell displayed brown at the transparent anode, white at the cathode, once every 0.25–0.33 second, for several million color reversals.

In this example $Tl^I$ ion has replaced the oxidized form of the leuco dye as the initial oxidant. The overall reaction is $$DH_2+2CH_3CO_2Tl \rightleftharpoons D+Tl^o+2CH_3CO_2H$$

where $DH_2$ is the leuco, D the dye.

Without the Tl compound, and with both the leuco and dye present, the applied potential can be as low as .5–.6 volt. Thus, the electrode potential for the $Tl^I$/Tl interconversion is only a few tenths volt greater than the electrode potentials required to interconvert this leuco and dye. Yet when power is shut off and the electrodes are connected through a low impedance wire, the cell decolors almost instantly, owing to the overall reaction being driven to the left (at rest state). The other ingredients (acetate ion, acetic acid, zinc oxide and DMF) are completely inert under these conditions.

Thallous p-toluene sulfonate and thallous perchlorate can replace thallous acetate with substantially the same results. Good results can also be obtained by employing either cadmium acetate or lead acetate as the participating current-carrier in the above formulation and operating at about 1.5 and 1.2 volts respectively.

EXAMPLE 6

(A) A FIGURE 1 cell was loaded with a paste made from 0.8 gram (.002 mole) 2-(4-hydroxyphenyl)-4,5-bis(4-methoxyphenyl)imidazole.

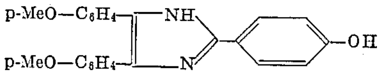

0.5 gram (.004) silver acetate
75 gram zinc oxide
25 ml. dimethylformamide

At 3 volts and about 1 reversal every second this cell went through more than $10^5$ white/red-brown color changes without apparent breakdown.

2-(4-hydroxy - 2,3,5,6 - tetramethylphenyl)4,5-bis(4-dimethylaminophenyl)imidazole as the leuco in this system gives comparable performance (white/blue color change) at 2.5 volts.

Like Zn acetate of Example 3 and Tl acetate of Example 5, Ag acetate participates in the above color change systems, $$DH_2+CH_3CO_2Ag \rightleftharpoons D+Ag^o+CH_3CO_2H$$

where $DH_2$/D is the color change redox couple, and the $Ag^o$ is deposited at the cathode under the applied potential.

In contrast when more easily oxidized leuco dye or when silver nitrate is used in these systems, the cells soon become inoperative, as $Ag^+$ chemically oxidizes the leucos and is reduced to free metal throughout the cell composition.

This illustrates how the counterion ion (acetate versus nitrate) can influence the cation's redox potentials and how important it is for electrochromic compositions. Similarly part B below illustrates how the cation can determine anion operability.

(B) Example 6(A) was repeated with a similar composition based on the leuco dye of Example 1 (.002 mole), ZnO (50 grams), dimethylformamide (20 ml.) and AgI (.002 mole) as the participating current-carrier. Operated at 2.5 volts and 2 c.p.s., the cell showed several hundred thousand color changes without apparent interference by iodide ion. In marked contrast, with $ZnI_2$, and more pronouncedly with KI, in place of the AgI the cell is inoperative, as the iodine to iodine oxidation predominates.

EXAMPLE 7

An electrochromic paste composed of 1.0 gram (.002 mole) tris(2-methyl-4-dimethylaminophenyl)methane,
2.9 grams (.005 mole) zinc-p-toluenesulfonate
14 grams zinc oxide
14 grams zinc sulfide and
10 grams dimethylformamide was mounted between a transparent glass electrode and a zinc plate electrode in a cell otherwise identical to that described under FIGURE 1. An automatic switch connected the electrodes alternately, every .33 second, to (a) an external power supply, so that the transparent electrode was always anodic under power, and to (b) each other through a low impedance wire. At a 3 volt potential the transparent anode displayed a blue color as the triaryl methane was oxidized to dye $$(Ar_3CH \rightarrow Ar_3C^+ + 2e + H^+)$$

while zinc ion plated out on the zinc cathode $$(Zn^{+2} + 2e \rightarrow Zn)$$

Step (a) converts the cell to a power generator such that when the electrodes are connected through the low impedance path in the alternative step (b), the transparent electrode becomes cathodic and the dye is instantly (i.e. within .33 second) reduced there, that is the color is erased. This was repeated for several hundred thousand on (color) -off (colorless) displays. Under these conditions the other ingredients are inert, requiring much higher potentials for electrolysis.

This cell withstands unidirectional current at 1.5–2 volts for weeks (continuous color display without apparent adverse effects) until all the zinc ion has deposited on the cathode. It returns to its original state on standing or on having the electrodes shorted.

Similar performance is observed on employing other leuco triarylmethanes in this example: Methylene Blue at 1.5 volts and Malachite Green at 2.5–3 volts.

EXAMPLE 8

Cells were constructed as in Example 7 using (1) electrochromic pastes involving the Example 1 leuco dye (.005 mole), zinc oxide (45 grams), dimethylformamide (20 ml.), and a metal acetate (.01 mole, as identified below), and (2) a metallic back electrode corresponding to the metal of the metal acetate.

These cells, based on the overall reaction $$DH_2 + (CH_3CO_2)_2M \rightleftharpoons D + M \text{ (Deposit)} + 2CH_3CO_2H$$

where $DH_2/D$ is the leuco/dye color change couple, $M^{+n}/M$ is the color control couple and the system to the right is the colored, higher-energy state. The cells were operated at the potentials tabulated below with polarity reversal every .33 sec. for several hundred thousand color reversals, with no apparent degradation.

| Metal of metal acetate and back electrode: | Minium operating voltage, volts |
|---|---|
| Zn | 2.3 |
| Cd | 1.5–1.7 |
| Pb | 1.2–1.3 |
| Sn | ca. 1 |

The minimum operating voltages and the effectiveness of the back electrodes to erase the display under no applied potential decrease in the order shown. Thus when these cells are operated with interrupted current flow as in Example 7, the Zn cell self-erases within .33 second, the others self-erase progressively slower, taking 1–2 seconds.

EXAMPLE 9

A FIGURE 1 cell, loaded with a transparent solution containing 0.86 part (.002 mole) of the Example 1 leuco dye, 2-(4-hydroxy - 3,5 - dimethoxyphenyl) - 4,5 - bis(methoxyphenyl) imidazole
2.0 parts (.005 mole) $SnCl_4 \cdot 2DMF$ complex and
48 parts dimethylformamide (DMF), was operated in two steps. In the first, two dry cell batteries applied 3 volts potential such that one electrode was always anodic, the other always cathodic for 0.5 second, whereupon the initially colorless solution, viewed through either electrode, turned red; in the second, the power was interrupted for one second, whereupon the color disappeared. There were thus recorded several thousand such color displays and erasures.

The overall reaction is $$DH_2 + Sn^{+4} = D + Sn^{+2} + 2H^+$$

where leuco $DH_2$ and dye (D) constitute the color change couple, $Sn^{+4}$ and $Sn^{+2}$ the color control couple.

The redox potential for this leuco dye/dye interconversion is about .5 volt, somewhat higher for the $Sn^{+4}/Sn^{+}$ interconversion. This cell also operates at about two volts. At these potentials and response times the background is essentially inert, and requires greater than three volts for elecrolysis.

The above elecrochromic formulation can be thickened with "Orlon" acrylic polymer, "Butacite" polyvinyl butyral resin, polyvinyl acid phthalate, or "Cab-O-Sil" colloidal silica. without losing its transparency or effectiveness to display color and self-erase.

Alternatively, opaque self-erasing cells are obtained by employing 100–150 grams zinc oxide as opacifier. These spontaneously decolorize much faster than the clear cells.

EXAMPLE 10

A transparent self-erasing device was constructed by loading a cell, as described in FIGURE 1, with a solution of 0.8 part (.002 mole) 2-(4-hydroxy-3,5-dimethylphenyl)-4,5-bis(methoxyphenyl) imidazole
1.1 parts (.005 mole) di-t-butyl-benzoquinone
2.7 parts (.005 mole) aluminum p-toluenesulfonate
48 parts dimethylformamide, thickened with
6 parts "Orlon" acrylic fiber.

An automatic double-throw double-pole switch applied a constant 2.2 volts across the electrodes and reversed polarity every 0.33 second. This caused the solution to turn orange-brown and alternately to decolorize every complete cycle. The cell was operated for more than $10^6$ cycles without adverse effect. The overall reaction is $$DH_2 + Q = D + QH_2$$

where $DH_2$ is the leuco, D the dye, Q the quinone, $QH_2$ the corresponding hydroquinone, the energized colored state is to the right, the at rest decolored to the left.

In this system the quinone has replaced the dye as the initial oxidant. The redox potentials are such that this cell can be operated with interruption of power in the reverse step since the hydroquinone spontaneously and instantly reduces dye, D, back to leuco as indicated in the above equation.

The 2.2 volts applied is somewhat greater than the color system's redox potentials (about 1 volt for $Q/QH_2$, .5 volt for $DH_2/D$) but is still below the potential (over 3 volt) at which the background electrolyzes (i.e. contributes to current flow in the indicated response interval).

EXAMPLE 11

A self-erasing opaque device was constructed utilizing a paste made from 0.9 part (.002 mole) 2-(4-hydroxy-3,5-dimethoxyphenyl)-4,5-bis(dimethylaminophenyl) imidazole
1.1 parts (.005 mole) di-t-butyl benzoquinone
2.9 parts (.005 mole) zinc p-toluenesulfonate
20 parts titanium dioxide, and
7 parts dimethylformamide The cell, operated under the condition of Example 10, but at 1–1.5 volts, showed blue to colorless transitions, for $2 \times 10^7$ cycles (about 8 months uninterruptedly). The color display spontaneously erased on interrupting the current. At these potentials the quinone takes part in the color change system as discussed in Example 10; zinc ion is not electrolyzed and functions essentially as electrolyte.

EXAMPLE 12

Self-erasing opaque devices were constructed as in Example 11 utilizing different solvents as tabulated below to make pastes from .86 gram (.002) leuco blue, 2-(4-hydroxy-3,5-dimethylphenyl) 4,5-bis(4-dimethylaminophenyl) imidazole,
.44 gram (.002 mole) di-t-butylbenzoquinone
.46 gram (.004 mole) tetraethylammonium perchlorate, 50 grams zinc oxide
15–25 ml. solvent.

Each cell was operated under the conditions given below for $10^6$ blue/white color changes without apparent sign of fatigue.

| Electrolyte Solvent | Applied Voltage | Electrode Polarity Reversed, c.p.s. |
|---|---|---|
| Methanol | 1.5 | 3 |
| Ethanol | 1.5 | 3 |
| Dimethyl sulfoxide | 1.5 | 3 |
| Benzonitrile | 1.5 | 1.5 |
| Benzylnitrile | 1.5 | 1.5 |
| Methyl ethyl ketone | 1.5 | 1.5 |
| Diethylene glycol dimethyl ether | 3 | 1 |
| Do | 4.5 | 3 |

Speed of color display and erasure is most rapid with the first 3 solvents at the low voltage. The last entry shows response time can be decreased by increasing the voltage (to increase current flow). Even at the 3.5–4 volts needed to develop comparably intense color displays, the background is essentially inert.

EXAMPLE 13

A dichroic light transparent composition was formulated from

.9 gram (.002 mole) leuco blue,

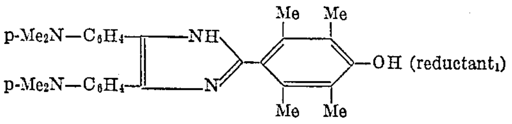

.8 gram (.002 mole) red dye,

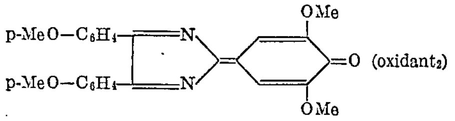

.9 gram (.008 mole) $(C_2H_5N)_4\,ClO_4$,
100 ml. dimethylformamide, and
6 gram "Cab-O-Sil" colloidal silica.

The color change system is $$\underset{\text{colorless}}{\text{reductant}_1} + \underset{\text{red}}{\text{oxidant}_2} = \underset{\text{blue}}{\text{oxidant}_1} + \underset{\text{colorless}}{\text{reductant}_2}$$

Loaded with this composition, an Example 1 cell having front and back transparent electrodes was red at rest, turned blue-purple in about .5 sec. at 1.5 volts, and regained its original red color in 10–15 seconds when the current was interrupted. It showed such transparent dichroic displays for 100,000 cycles without sign of fatigue.

EXAMPLE 14

(A) A dichroic cell as constructed as in Example 13 except that the silica thickener was replaced by ZnO (120 grams) to render the system opaque and less (50 ml.) dimethylformamide was used. This cell turns blue in .33 seconds at 1.5 volts, can be operated repeatedly (for over $10^6$ color reversals) at 3 c.p.s., and regains its at rest color also within .33 second.

(B) An opaque dichroic cell was similarly prepared

.8 gram (.002 mole) the leuco green of Example 2,
.85 gram (.002 mole) the orange dye,

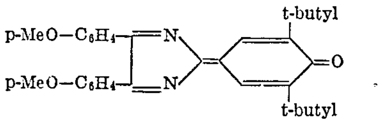

.46 gram (0.004 mole) $(C_2H_5)_4NClO_4$
50 ml. dimethylformamide and
120 grams stannic oxide This cell turns olive green in .33 sec. at 1.5 volts, regains its at rest orange color within .33 second, and can be operated repeatedly (for over $10^6$ color reversals) at 3 c.p.s.

EXAMPLE 15

A self-erasing electrochromic paste, prepared by mixing 0.46 part (.002 mole) tetramethylammonium thiocyanate
0.40 part (.006 mole) ferrous chloride
3.0 parts (.008 mole) $SnCl_4\cdot 2DMF$ complex
20 parts stannic oxide and
7 parts dimethylformamide (DMF), was mounted between transparent electrodes of a FIGURE 1 cell. Applying 2.3 volts caused the initially colorless composition to turn orange at the transparent anode. Reversing polarity restored the colorless state. The cell was operated under alternating potential every .5 second for several hundred thousand orange-colorless displays.

The overall reaction is $$2Fe^{+2}+Sn^{+4}+6CNS^{-}=2Fe(CNS)_3+Sn^{+2}$$

where the colorless at rest state is to the left, the colored higher energy state is to the right, and $Sn^{+2}$ spontaneously reacts with the colored ferrithiocyanate to restore the colorless condition within .5 second when the potential is removed.

The stannic oxide (opacifier) is not essential for operability. Without it, the cell is transparent and self-erasing.

$FeCl_3$ can replace $SnCl_4$ in the above opacified cell. The cell, though no longer self-erasing, can be operated reversibly in a flip-flop manner for orange-colorless displays.

EXAMPLE 16

An Example 1 cell was loaded with a paste made from .36 gram (.001 mole) N,N,N',N'-tetramethyl-p-phenylenediamine dihydrogen perchlorate, $$p\text{-}HMe_2\overset{+}{N}\text{—}C_6H_4\text{—}\overset{+}{N}Me_2H\cdot\text{—}2ClO_4\text{—}$$

.40 gram $SnCl_4\cdot 2DMF$ (.001 mole)
15 ml. dimethylformamide (DMF) and
60 grams zinc oxide, and operated reversibly at 1.2 volts and 1 c.p.s. uninterruptedly for months without apparent degradation. The color change is white to blue at the anode, blue to white at the cathode. The blue color is believed attributable to "Wurster's Blue," a radical cation.

The preceding representative examples may be varied within the scope of the present total specification disclosure, as understood and practiced by one skilled in the art, to achieve essentially the same results.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are as follows:

1. A color-reversal electrochromic device comprising:
(A) a unit cell defining a volume having a front transparent area electrode spaced from a facing back area electrode,
(B) means for applying a color-forming potential across said cell with means for reversing electrode polarity,
(C) an electrolytically-conductive color change composition occupying said volume which comprises:
(1) a reductant/oxidant pair where
(a) said reductant is a member of a redox couple, that is, said reductant is anodically oxidizable and cathodically regeneratable,
(b) said oxidant is a member of a redox couple, that is, said member is cathodically reducible and anodically regeneratable,
(c) at least one of said redox couples is a color change couple, that is, the redox members are differently colored, (2) a color control means for preventing visual observation of the redox couple's colored species at the back electrode when the colored species is being electrolytically decolored at the front electrode, and (3) a fluid electrolyte which (a) solubilizes color-imparting amounts of said redox components (b) is inert to the electrodes and the redox components, and (c) exclusive of the redox components does not electrolyze in preference to the redox components at color-forming potentials.

2. A color-reversal electrochromic device according to claim 1 wherein the reductant/oxidant pair is $Red_1/Ox_1$, where $Red_1$ and $Ox_1$ are differently colored and the color control means is an inert opacifier present in an amount rendering said color change composition opaque to visible light.

3. A self-erasing color-reversal electrochromic device according to claim 1 wherein (A) the reductant/oxidant pair is $Red_1/Ox_2$, a first mixed pair, where (1) $Red_1$ is a member of the color change redox couple $Red_1/Ox_1$, $Red_1$ being differently colored than $Ox_1$ and anodically oxidizable to and cathodically regeneratable from $Ox_1$, and (2) $Ox_2$ is a member of a second redox couple, $Red_2/Ox_2$, said $Ox_2$ being cathodically convertible to and anodically regeneratable from $Red_2$, (3) said first pair is electrolytically convertible to and regeneratable from a differently colored second mixed pair, $Ox_1/Red_2$, where $Ox_1$ and $Red_2$ have the significance ascribed above, and (B) the potential for oxidizing $Red_1$ to $Ox_1$ is sufficiently more anodic than the potential for oxidizing $Red_2$ to $Ox_2$ and the potential for reducing $Ox_2$ to $Red_2$ is sufficiently more cathodic than for reducing $Ox_1$ to $Red_1$ so that when the device is not under applied color-forming potential, $Red_2$ spontaneously reduces $Ox_1$ to $Red_1$ with attendant color change, whereby said second redox couple is a color control means.

4. A self-erasing color-reversal electrochromic device according to claim 3 which also contains an inert opacifier in an amount rendering said color change composition opaque to visible light.

5. A self-erasing transparent color-reversal electrochromic device according to claim 3 wherein both of said electrodes and the color change composition at rest and under applied potential are transparent to light.

6. A device according to claim 3 wherein the potentials for oxidizing said $Red_1$ and said $Red_2$ to $Ox_1$ and $Ox_2$ are less anodic than +1 volt relative to a saturated calomel and the potentials for reducing $Ox_1$ and $Ox_2$ to $Red_1$ and $Red_2$ are less cathodic than −1 volt relative to a saturated calomel electrode and the potential required to interconvert $Red_1/Ox_2$ and $Ox_1/Red_2$ are not more than 0.8 those required to electrolyze any other component of the cell composition.

7. A self-erasing color-reversal electrochromic device according to claim 3 wherein $Red_1$ is a leuco dye which is oxidized to $Ox_1$ at a potential less anodic than +1 volt relative to a saturated calomel electrode and $Ox_1$ is the corresponding dye which is reduced to the leuco at a potential less cathodic than −1 volt relative to a saturated calomel cathode, and $Ox_2$ is a reversibly reducible oxidant taken from the group consisting of:

(A) electrolyte-soluble cations that are reversibly reduced to electrolyte-soluble lower valent cations, (B) electrolyte-soluble cations that are reversibly reduced to and thereby plated at the cathode as the free metal, (C) electrolyte-soluble anions that are reversibly reduced to electrolyte-soluble higher valent anions, and (D) electrolyte-soluble quinones that are reversibly reduced to electrolyte-soluble hydroquinones, said $Ox_2$ being cathodically reducible to, and anodically regeneratable from, the corresponding reduced form at applied potentials not more than cathode than −1 volt and not more anodic than +1 volt relative to a saturated calomel electrode, and the potentials required to interconvert $Red_1/Ox_2$ and $Ox_1/Red_2$ are not more than 0.8 those required to electrolyze any other component of the cell composition.

8. A self-erasing transparent color reversal electrochromic device according to claim 7 wherein $Ox_2$ is an electrolyte-soluble quinone, and both of said electrodes and the color change composition at rest and under applied potential are transparent to light.

9. A self-erasing transparent color-reversal electrochromic device according to claim 7 wherein $Ox_2$ is an electrolyte-soluble cation that is reversibly reduced to an electrolyte-soluble lower valent cation and both of said electrodes and the color change composition at rest and under applied potential are transparent to light.

10. A self-erasing color change electrochromic device according to claim 7 wherein $Ox_2$ is an electrolyte-soluble cation that is reversibly reduced to and plated at the cathode as the free metal and the device additionally contains a means for connecting the two electrodes through a low impedance path.

11. A self-erasing opaque color change electrochromic device according to claim 7 which additionally contains a substantially neutral, electrolyte-insoluble polyvalent heavy metal chalcogenide which is non-transparent and differently colored than the redox system's color member, said opacifier being present in an amount sufficient to render the color change composition opaque to visible light.

References Cited

UNITED STATES PATENTS

| | | |
|---|---|---|
| 3,123,806 | 3/1964 | Alburger. |
| 1,068,774 | 7/1913 | Hutchison. |

RONALD L. WIBERT, *Primary Examiner.*

P. K. GODWIN, *Assistant Examiner.*

U.S. Cl. X.R.

252—62.2